United States Patent [19]

Ulbing

[11] Patent Number: 4,909,099

[45] Date of Patent: Mar. 20, 1990

[54] ROTARY/LINEAR ACTUATOR

[75] Inventor: Otmar M. Ulbing, Fairport, N.Y.

[73] Assignee: Windwinder Corporation, Tipp City, Ohio

[21] Appl. No.: 276,911

[22] Filed: Nov. 28, 1988

Related U.S. Application Data

[63] Continuation-in-part of Ser. No. 187,571, Apr. 28, 1988, Pat. No. 4,848,184, which is a continuation-in-part of Ser. No. 92,955, Sep. 4, 1987, Pat. No. 4,854,189.

[51] Int. Cl.$^4$ ............................................. F16H 37/00
[52] U.S. Cl. .................................................... 74/640
[58] Field of Search .......................................... 74/640

[56] References Cited

U.S. PATENT DOCUMENTS

| | | | |
|---|---|---|---|
| 2,906,143 | 9/1959 | Musser | 74/640 |
| 2,943,508 | 7/1960 | Musser | 74/424.8 |
| 3,117,763 | 1/1964 | Musser | 74/640 |
| 3,374,372 | 3/1968 | Tinder et al. | 74/640 |
| 3,895,288 | 7/1975 | Lampen et al. | 323/94 R |
| 4,557,153 | 12/1985 | Ulbing | 74/2 |

Primary Examiner—Leslie A. Braun
Assistant Examiner—Scott Anchell
Attorney, Agent, or Firm—Bean, Kauffman & Spencer

[57] ABSTRACT

A rotary/linear actuator of the type having power driven rotary balls adapted to impose a strain wave on a flexible sleeve for purposes of flexing screw threads carried by the sleeve radially into engagement with threads carried by an outer sleeve for purposes of effecting axial displacements of the outer sleeve relative to the flexible sleeve, employs an improved flexible sleeve permitting essentially uniform radial deflection of its screw threads in a direction extending lengthwise thereof. The actuator includes an improved motor mounting arrangement and alternative touch controlled potentiometer constructions. An alternative actuator construction is disclosed, wherein the flexible sleeve is formed as an integral part of an inner sleeve of the actuator.

26 Claims, 2 Drawing Sheets

ROTARY/LINEAR ACTUATOR

REFERENCE TO RELATED APPLICATIONS

This is a continuation-in-part of U.S. patent application Ser. No. 07/187,571, filed Apr. 28, 1988, now U.S. Pat. No. 4,848,184, which is a continuation-in-part application of U.S. patent application Ser. No. 07/092,955, filed Sept. 4, 1987, now U.S. Pat. No. 4,854,189.

BACKGROUND OF THE INVENTION

This invention generally relates to power transmission devices or actuators of the rotary-to-linear motion converting type.

More particularly, the present invention is directed to rotary-to-linear actuators of the general type disclosed in my prior U.S. Pat. No. 4,557,153 and my co-pending U.S. patent applications Ser. No. 07/092,955, filed Sept. 4, 1987, and Ser. No. 07/187,571, filed Apr. 28, 1988, wherein a rotary component is fixed against axial displacement during operation of the actuator and serves to deform the external screw threads of a flexible sleeve outwardly into threaded engagement with internal screw threads of an outer sleeve to effect extending-/contracting movements of the actuator.

The actuator of U.S. Pat. No. 4,557,153 is characterized in that its flexible sleeve is axially fixed, and its outer sleeve is subject to axial displacement.

The actuators of U.S. patent application Ser. Nos. 07/187,571 and 07/092,955 are characterized in that their outer sleeves are rotationally and axially fixed, their flexible sleeves are subject to axial displacement, and touch control potentiometers are employed to provide indications of the relative position of the outer and flexible sleeves.

SUMMARY OF THE INVENTION

The present invention is directed to a rotary/linear actuator of the type having a power driven rotary component adapted to impose a strain wave on a flexible sleeve for purposes of flexing screw threads carried by the flexible sleeve radially outwardly into driving engagement with threads carried by an outer sleeve for purposes of effecting axial displacements of the outer sleeve relative to the flexible sleeve.

More particularly, the present invention is directed towards an improved flexible sleeve construction, which permits essentially uniform radial deflection of its screw threads in order to avoid non-uniform engagement thereof with the screw threads of the outer sleeve. The flexible sleeve is designed and arranged to additionally provide abutments serving to define extended and contracted conditions of the actuator.

The actuator of the present invention additionally includes an improved arrangement for mounting the drive motor of the actuator.

Several alternate operators are disclosed for use with a touch controlled potentiometer whose output is indicative of the condition of the actuator, i.e. the relative axial positions of the outer sleeve and the flexible sleeve.

An alternative actuator construction is disclosed, wherein an inner sleeve of the actuator, which serves to support the flexible sleeve, the outer sleeve and the motor of the actuator, is formed integrally with the flexible sleeve. This construction facilitates mounting of both the outer sleeve and the motor relative to the inner sleeve.

The specific form of actuator disclosed herein is a fail in place actuator, wherein the actuator tends to remain in the condition thereof existing at a time when a supply of energizing current to the drive motor is terminated, but allows the outer sleeve to be axially displaced relative to the flexible sleeve by effecting manual rotations of the outer sleeve. However, as will be apparent, certain features of the present actuator are equally adapted for use in a fail safe type actuator, that is, an actuator having a spring or other suitable bias serving to place the actuator in a desired condition, such as its fully retracted condition, upon the interruption of current supply to the drive motor of the actuator.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
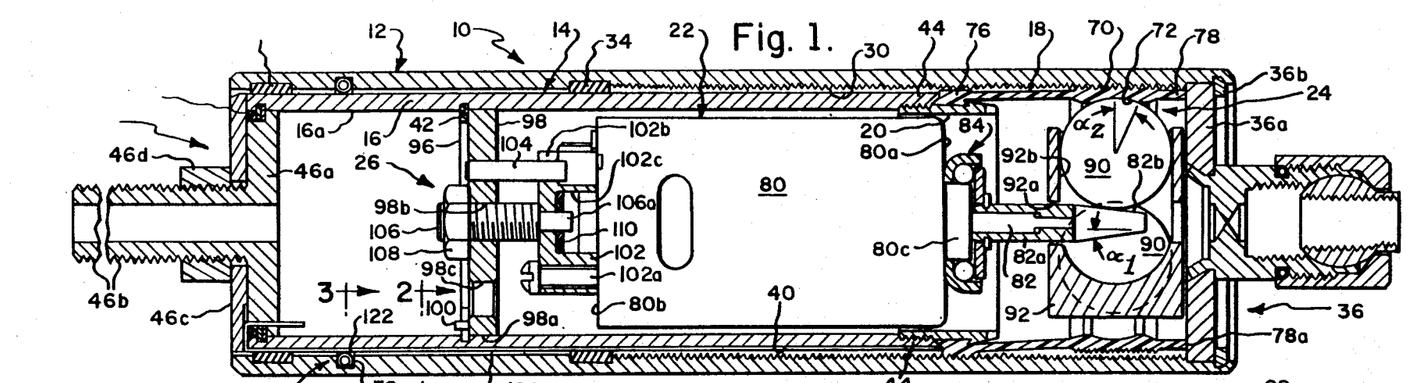
FIG. 1 is a sectional view taken axially through an actuator formed in accordance with the present invention.

Reference is first made to FIG. 1 wherein a rotary/-linear actuator formed in accordance with a preferred form of the present invention is generally designated as 10.

Actuator 10 includes a generally cylindrical, rigid outer sleeve 12; a generally cylindrical inner sleeve 14 defined by a rigid sleeve section 16, a resiliently deformable or flexible sleeve 18 and a connecting or mounting sleeve 20 serving to interconnect the rigid sleeve section and flexible sleeve in axial alignment; an electrically powered motor 22; a power driven rotary component 24; a motor mounting assembly 26; and a touch controlled potentiometer 28 for sensing the relative axial positions of the outer and inner sleeves.

Outer sleeve 12 is provided with or carries an inwardly facing screw threaded section or portion 30, whose length as measured lengthwise or axially of the outer sleeve, is determined by the desired extent of telescopic movement of the outer sleeve relative to inner sleeve 14; annular bearings 32 and 34 for slidably and rotatably supporting the outer sleeve on rigid sleeve section 16; an operating end closure assembly 36 for coupling the outer sleeve to an art device, such as a valve, not shown, whose operation is to be controlled by actuator 10; and a radially inwardly facing annular groove 38 disposed intermediate the annular bearings. End closure assembly 36 may be variously defined, but is shown for purposes of example as including an end closure plate 36a removably clamp attached to outer sleeve 12 by a snap-ring retainer 36b. Outer sleeve 12 may be formed of any desired material, such as for example aluminum or stainless steel, depending upon the intended use of actuator 10.

Rigid inner sleeve section 16 is provided with a lengthwise extending, radially outwardly opening mounting groove 40; a radially inwardly facing annular mounting groove 42; an end section 44 having internal threads 44a for threadably receiving a threaded portion 20a of connecting sleeve 20 and an undercut, end clamping surface 44b; and an actuator mounting assembly 46 for use in mounting actuator 10 relative to a desired supporting structure, not shown. Mounting assembly 46 may be variously defined, but is shown for example as including a retainer plate 46a mounting an externally threaded and through bored mounting stud 46b; a rear closure plate 46c; a jam nut 46d threadably mounted on the mounting stud for purposes of clamping the closure plate against the retainer plate; and snap ring and O-ring sealing assembly 46e for attaching and fluid sealing the periphery of the retainer plate to rigid sleeve section 16. Mounting stud 46b serves as both a means of mounting actuator 10 and as a conduit for wires, not shown, passing inwardly of the actuator for connection to motor 22 and potentiometer 28. Sleeve section 16 may be formed of any desired material, such as for example aluminum or stainless steel, depending upon the intended use of actuator 10.

Figure 6:
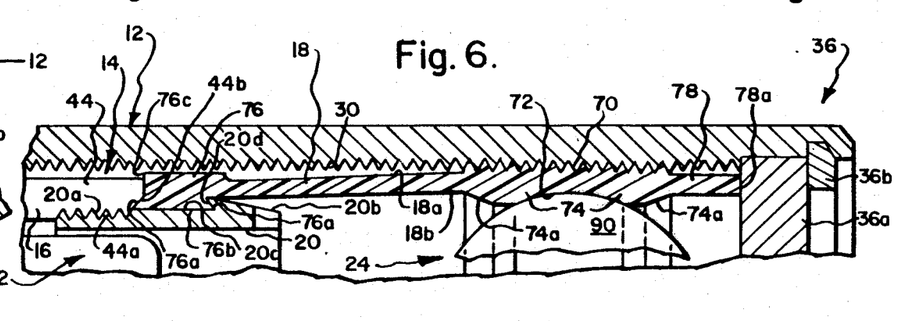
FIG. 6 is an enlarged view of the area designated as FIG. 6 in FIG. 1.

Flexible sleeve 18 is best shown in FIG. 6 as being of a relatively thin wall design, wherein a mid portion thereof is formed with outwardly facing screw threaded section or portion 70 whose axial length is less than the axial length of inwardly facing screw threaded portion 30 and whose roots are essentially coplanar with the outer surface 18a of the flexible sleeve; and an annular enlargement defining an inwardly facing, concave track 72 bounded by annular rim portions 74 and 74, which have oppositely facing annular surfaces 74a and 74a extending from adjacent opposite edges of the track in a radially outwardly divergent relationship towards an inner surface 18b of the flexible sleeve. Preferably, the points of juncture of surfaces 74a and 74a with inner surface 18b are disposed in essential radial alignment with the opposite axial ends of threaded portion 70. Flexible sleeve 18 additionally includes a mounting end 76 in the form of an annular enlargement, which preferably projects both radially outwardly and inwardly of surfaces 18a and 18b, respectively, and defines axially oppositely facing annular clamping surfaces 76a and 76a arranged to diverge radially inwardly of inner surface 18b, an inwardly facing cylindrical surface or bore 76b and an annular, radially outwardly extending end or abutment surface 76c. An opposite end 78 of sleeve 18 defines an annular end or abutment surface 78a arranged to face in a direction opposite to that of abutment surface 76c. Abutment surface 76c is arranged for engagement with bearing 34 for purposes of limiting relative telescopic sliding movement of outer sleeve 12 relative to inner sleeve 14 towards the right, as viewed in FIG. 1, so as to define an extended condition of actuator 10, not shown. Conversely, abutment surface 78a is arranged for engagement with end closure assembly 36 for purposes of limiting relative telescopic sliding movement of the outer sleeve relative to the inner sleeve towards the left, as viewed in FIG. 1, so as to define the illustrated contracted condition of the actuator. Flexible sleeve 18 is preferably formed of a plastic material, such as for example Nylon filled with fiberglass, but the material is a matter of choice providing that same is capable of allowing for driving engagement/disengagement of screw threaded section 70 with screw threaded section 30 throughout the life of actuator 10.

Connecting sleeve 20 is best shown in FIG. 6 as being formed with a frusto-conical ramp or cam surface 20b, a generally cylindrical outer surface 20c and an annular clamping surface 20d. As shown in FIG. 6, surface 20d and surface 44b converge in a direction extending radially outwardly of inner sleeve 14 and clampingly engage with surfaces 76a and 76a upon threading of threaded portion 20a into threaded portion 44a for purposes of removably fixing flexible sleeve 18 to rigid sleeve section 16 to extend coaxially therewith. Connecting sleeve 20 is inserted within flexible sleeve 18 prior to attachment of the connecting sleeve to rigid sleeve section 16 by forcing ramp surface 20b axially inwardly of surface 76b incident to which mounting end 76 is forced to undergo temporary resilient expansion and thereafter permitted to contract to position cylindrical surfaces 76b and 20c in essential engagement.

Motor 22 is shown in FIG. 1 as having a casing 80 formed with first and second ends 80a and 80b, and a drive shaft 82 extending outwardly through first end 80a and having a driving end 82a whose outer surface 82b tapers in a direction axially away from the first end to form an angle $\alpha_1$ with the axis of rotation of the drive shaft. Preferably, driving end 82a is formed separately from drive shaft 82, and arranged to transmit axial loadings imposed thereon directly to first end 80a via a thrust bearing 84 journalled on casing extension 80c. A suitable device, not shown, is employed to key driving end 82a for rotation with drive shaft 82, while permitting axial sliding movement therebetween.

Rotary component 24 preferably includes a plurality of uniformly sized, rigid rotary members 90, such as for example three balls; and a cage 92, which is journalled on drive shaft 82 by means of bore opening 92a and is formed with radially opening pockets 92b, which serve to individually mount the balls for radially directed movement under the control of drive shaft end 82a and within a plane annularly bisecting track 72, such that the balls are arranged to engage with peripherally separate and uniformly spaced, portions of the track. Preferably, the radius of curvature of balls 90 is essentially equal to the radius of curvature of track 72, as measured transversely of the track, and the track is sized such that an angle $\alpha_2$, which corresponds to one half of an arc angle through which the surfaces of the balls engage with the track, is greater than $\alpha_1$, as shown in FIG. 1. Maintenance of this angular relationship ensures that balls 90 are not displaced transversely from within track 72 due to the axially directed load imposed by tapered surface 82b with which the balls engage. As a result, balls 90 and cage 92 are retained in a fixed position axially of flexible sleeve 18 and serve to mount one end of motor 22.

Figure 2:
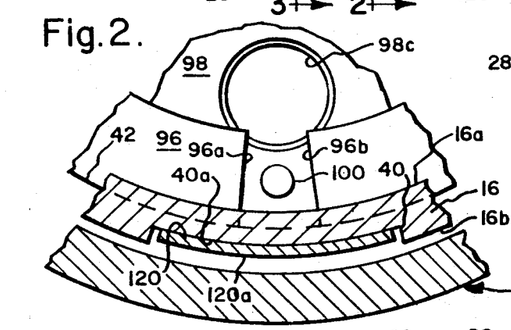
FIG. 2 is a sectional view taken generally along line 2—2 in FIG. 1.

Motor mounting assembly 26 is shown in FIGS. 1 and 2 as including a C-shaped resiliently deformable snap ring 96, which has spaced opposite ends 96a and 96b and is mounted within annular groove 42 of rigid sleeve section 16; a circular plate or disc 98, which has its peripheral surface 98a disposed in rotational/sliding engagement with the inner surface 16a of the rigid sleeve section and is provided with a centrally located threaded opening 98b and an offset opening 98c for receiving wires, not shown, passing to motor 22; an abutment pin 100, which is supported by or formed integrally with plate 98 and positioned intermediate ends 96a and 96b; a motor mounting fixture 102, which is rigidly fixed to motor casing end 80b by bolts 102a and is formed with a guide slot 102b and a stepped bore opening 102c; a guide pin 104, which is fixed to plate 98 and slidably received within guide slot 102b; an adjustment screw 106, which is threadably received within plate opening 98b and provided with a reduced diameter bearing end portion 106a rotatably and slidably received within bore opening 102c; a lock nut 108, which is threadably received by adjustment screw 106 for bearing engagement with plate 98; and a lock ring 110, which frictionally engages with bearing end portion 106a and is freely rotatably received within bore opening 102c. With assembly 26 assembled and positioned in the manner shown in FIG. 1, plate 98 and motor mounting fixture 102, and thus motor casing 80, are constrained from relative rotational movement by guide pin 104 and guide slot 102b, but capable of movement axially of one another under the control of adjustment screw 106; and plate 98 is constrained against axial movement towards mounting assembly 46 by engagement with snap ring 96 and against rotational movement relative to inner sleeve 14 by engagement of abutment pin 100 with one or the other of opposite ends 96a and 96a of snap ring 96, which tends to expand when so engaged into frictional locking or braking engagement with the inner sleeve within groove 42. As a result, when screw 106 is adjusted, driving end 82a of drive shaft 82 is moved axially of inner sleeve 14 to cause balls 90 to roll up or down along tapered surface 82b, whereby to effect radially directed displacements of the balls within cage 92 as required to provide for adjustably controlled deformation of flexible sleeve 18. Thus, when motor 22 is energized, motor casing 80 is constrained against rotation relative to inner sleeve 14, while drive shaft 82 is free to rotate relative to the inner sleeve for purposes of driving balls 90 for movement along an orbital path of travel in engagement with track 72.

Figure 3:
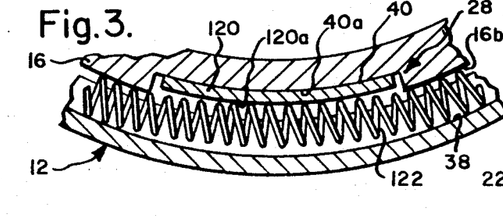
FIG. 3 is a sectional view taken generally along line 3—3 in FIG. 1.

A first form of touch controlled potentiometer 28 adapted for use with actuator 10 is shown in FIGS. 1 and 3 as including a potentiometer strip 120 fixed, as by adhesive, to extend lengthwise within groove 40 of rigid sleeve section 16 with its outer surface 120a disposed in a slightly recessed condition relative to the cylindrical outer surface 16b of the rigid sleeve section in order to avoid contact thereof with bearings 32 and 34; and a pressure member in the form of a circular or closed loop tension spring, such as a garter spring 122, which is positionally located relative to outer sleeve 12 by groove 38 and arranged to bear against the outer surface 16b while under sufficient tension to permit the pressure member to protrude into groove 40 for sliding engagement with potentiometer strip surface 120a for purposes of generating a signal indicative of the relative axial position of outer sleeve 12 relative to inner sleeve 14. In order to reduce the distance through which garter spring 122 is required to project into groove 40 for purposes of engagement with surface 120a, the bottom surface 40a of groove 40 is outwardly bowed or convexly shaped in order to transversely bow potentiometer strip 120 and position its mid section closely adjacent surface 16b, as best shown in FIGS. 2 and 3. Potentiometer strip 120 may be of any suitable design, such as for example that described in U.S. Pat. No. 3,895,288.

Figure 4:
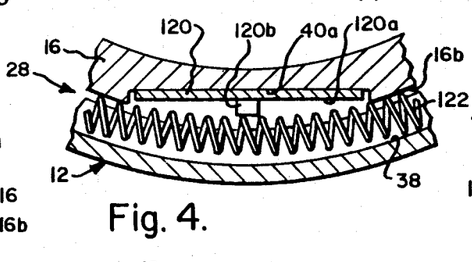
FIG. 4 is a sectional view similar to FIG. 3, but showing an alternative construction.

The potentiometer construction described with particular reference to FIG. 3 is quite effective in operation, but does suffer from the drawback that machining of groove 40 to form a convex configuration is expensive and care must be taken to employ an adhesive, which will maintain potentiometer strip 120 in a bowed condition against its tendency to return to its normal flat or planar condition. The potentiometer construction of FIG. 4 avoids these problems by forming bottom surface 40a as a flat surface and effectively raising the mid-section of potentiometer strip surface 120a by adhesively or otherwise joining thereto a lengthwise extending rib 120b, which upstands from the surface sufficiently to be slidably engaged by garter spring 122; the rib serving to transmit pressure forces exerted by the garter spring to the potentiometer strip for signal generation purposes. Rib 120b must be sufficiently rigid to be capable of transmitting pressure forces to surface 120a, while at the same time sufficiently resilient to ensure that the transmitted pressure forces are localized, that is, applied to surface 120a within a relatively small zone, as measured lengthwise of potentiometer strip 120.

Figure 5:
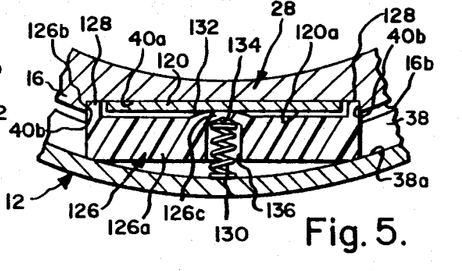
FIG. 5 is a sectional view similar to FIG. 3, but showing a further alternative construction.

FIG. 5 illustrates a further potentiometer construction, which makes use of a potentiometer strip receiving groove having a flat bottom surface 40a and replaces tension spring 122 of the previously described construction with a pressure applying member 126, which bridges between and is slidably received by both of grooves 38 and 40. Member 126 is considered as having a first portion 126a slidably received within groove 38; a second portion 126b, which is slidably received within groove 40 and preferably includes a pair of legs 128 and 128 arranged to slidably engage with opposite groove side walls 40b and 40b at points outwardly of the lengthwise extending edges of potentiometer strip 120; and a third portion 126c which is resiliently biased, such as by a compression spring 130, into engagement with potentiometer strip surface 120a. Preferably, member 126 is of integrally formed plastic construction, wherein third portion 126c is in the form of a projection having a dome shaped surface 132 arranged to engage with surface 120a and an opposite surface 134 arranged in alignment with an opening 136 formed in the first portion. Spring 130 is disposed within opening 136 with its opposite ends arranged to bear against surface 134 and the bottom wall 38a of groove 38.

Figures 7, 8, 9, 10, 11:
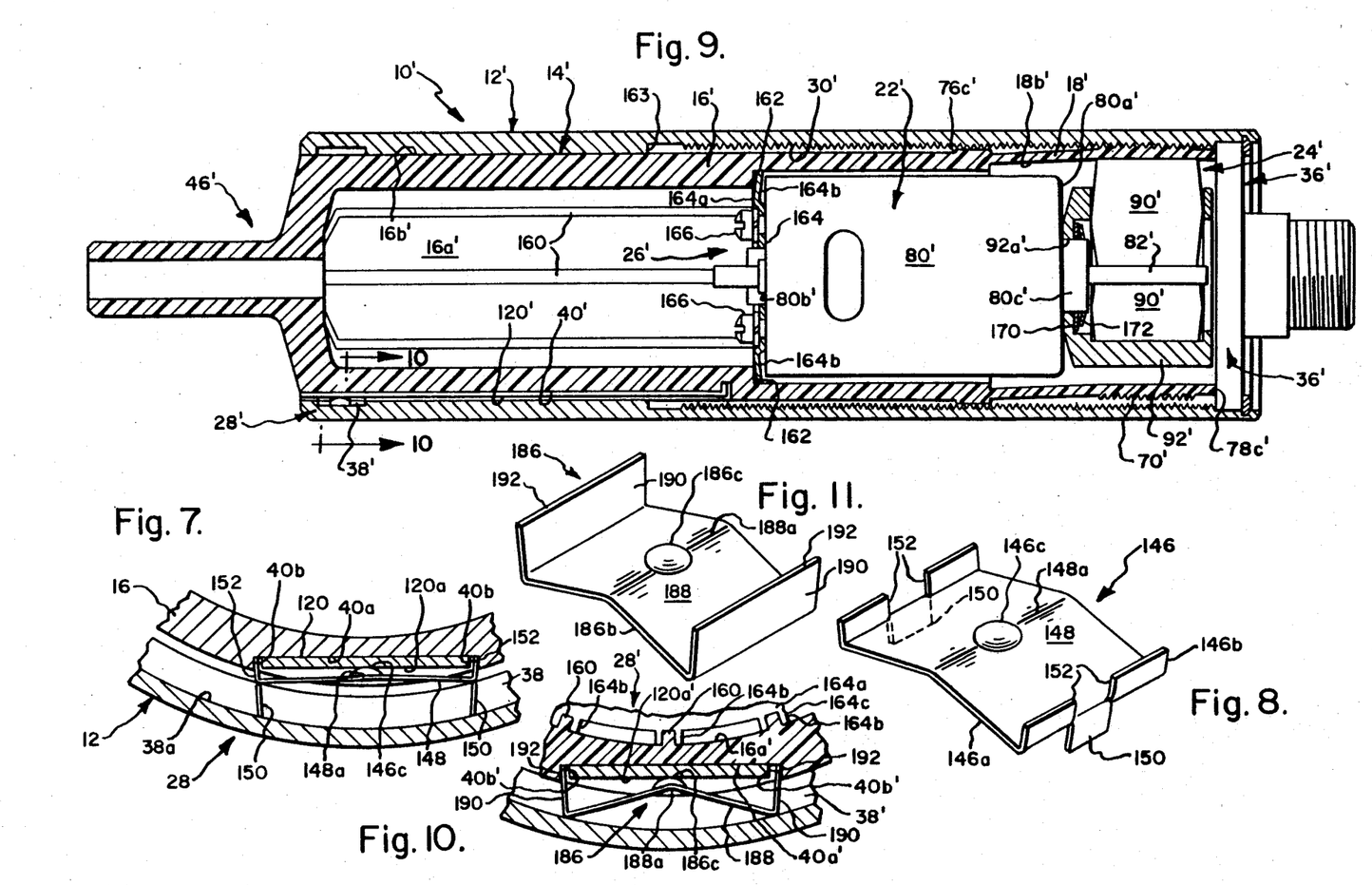
FIG. 7 is a sectional view similar to FIG. 3, but showing another alternative construction.
FIG. 8 is a perspective view of the pressure member shown in FIG. 7.
FIG. 9 is a view similar to FIG. 1, but showing an alternative actuator construction.
FIG. 10 is a sectional view taken along the line 10—10 in FIG. 9.
FIG. 11 is a perspective view of the pressure member shown in FIG. 10.

FIGS. 7 and 8 illustrate another potentiometer construction which makes use of a potentiometer strip receiving groove having a flat bottom surface 40a and a one piece pressure member 146 having first, second and third portions 146a, 146b and 146c, respectively. Preferably, member 146 is formed from sheet metal, wherein first portion 146a is in the form of a generally rectangular, V-shaped plate 148 having a convex apex 148a arranged to face towards surface 120a and a pair of legs 150 and 150 arranged to depend from its opposite edges for sliding receipt within groove 38; second portion 146b is defined by pairs of legs 152 and 152, which upstand from the opposite edges of plate 148 for receipt within groove 40 in sliding engagement with groove side walls 40b and 40b; and third portion 146c is defined by a generally dome shaped projection or dimple carried by plate 148 to project from apex 148a for engagement with surface 120a. Upon assembly of member 146 within grooves 38 and 40, the former is resiliently deformed to establish a bias for maintaining third portion 146c in sliding engagement with surface 120a under a pressure sufficient to generate a signal indicative of the relative positions of sleeves 12 and 14.

In operation of actuator 10, mounting assembly 26 acts to constrain motor casing 80 against rotation relative to inner sleeve 14 and cooperates with rotary component 24 to support motor 22 essentially concentrically within the inner sleeve and in an adjustably fixed position axially thereof, as determined by adjustment screw 106. Adjustment of the axial position of motor 22 is necessary only at the time of initial assembly of actuator 10, as required to initially permit insertion of balls 90 into track 72 and thereafter effect radial movement of the balls outwardly into a position in which they deform sleeve 18 sufficiently to position screw threads 70 in proper driving engagement with screw threads 30. In a typical installation, inner sleeve 14 is fixed against rotation and axial displacement by a support to which assembly 46 is connected and outer sleeve 12 is either constrained against or free to rotate, but in either case is capable of undergoing axial movement with an art device to which it is connected by means of assembly 36. When motor 22 is energized, rotation of drive shaft end 82a, while in surface engagement with balls 90, causes the balls to roll along track 72, whereby the points of driving engagement of screw threads 70 with screw threads 30 advance in a direction extending annularly of flexible sleeve 18 and axial displacement is imparted to outer sleeve 12. The relative axial position of outer sleeve 12 relative to inner sleeve 14 is continuously sensed by potentiometer 28. In the event of failure of the supply of current to motor 22, actuator 10 may be manually moved between its contracted and extended positions by simply manually rotating outer sleeve 12 relative to inner sleeve 14. All disclosed forms of potentiometer 28 and their mode of mounting within grooves 38 and 40 in the manner described allows relative rotational movements of sleeves 12 and 14 without interfering with the ability of such potentiometers to provide an indication of actual relative axial positions of such sleeves.

An alternative actuator construction is designated as 10' and shown in FIG. 9, wherein elements of actuator 10' which are similar to those of actuator 10, are designated by like primed numerals. Actuator 10' is similar to actuator 10 from the standpoint that it generally includes a rigid outer sleeve 12' having a screw threaded section 30'; an end closure assembly 36' and an inwardly facing annular groove 38'; an inner sleeve 14' having a rigid sleeve section 16' formed with a lengthwise extending and outwardly facing groove 40', a flexible sleeve 18' provided with a screw threaded section 70' and oppositely facing abutment surfaces 76c' and 78c', and a mounting assembly 46'; an electrically powered motor 22' having a casing 80' provided with opposite ends 80a and 80b and a casing extension 80c', and a drive shaft 82'; power driven rotary component 24' having a plurality of rotary members 90' mounted within a cage 92'; a motor mounting assembly 26'; and a touch controlled potentiometer 28'.

The construction of actuator 10' differs in several important respects from actuator 10. Specifically, inner sleeve 14' is of one piece molded plastic construction, wherein outer surface 16b' slidably supports outer sleeve 14' without the aid of additional bearing devices and inner surface 16a' is formed with lengthwise extending ribs 160, which serve to both rigidify section 16' and define annularly spaced, abutment surfaces 162 facing axially towards flexible sleeve portion 18'. In that outer sleeve 12' is not provided with bearing devices, it is necessary to provide same with an annular stop surface 163 arranged to engage with abutment surface 76c' for purposes of defining the extended position of the outer sleeve.

Further, inner sleeve 14' also differs from that of inner sleeve 14 in the absence of an annular, track defining enlargement 72 associated with flexible sleeve portion 18', which is rendered unnecessary by fitting rotary component 24' with rotary members 90' in the form of cylindrical rollers disposed in driven engagement with a cylindrical motor drive shaft 82'. Use of cylindrical drive shaft 82', as opposed to a drive shaft having a tapered end 82b, in turn renders it unnecessary to provide for axial adjustments of motor 22'. Thus, the structure of motor mounting assembly 26' may be greatly simplified, as compared to assembly 26, and may comprise simply a mounting plate 164, which is attached to casing unit 80b' by bolts 166 and sized to allow press fitting thereof into rigid sleeve 16' for abutting engagement with abutment surfaces 162. Preferably, plate 164 is defined by a main central portion 164a, which is rigidly clamped against casing end 80b' by bolts 166, and a plurality of locking or mounting tabs 164b, which extend radially of the main central portion and are annularly spaced one from another for alignment/abutting engagement with surfaces 162, as shown in FIGS. 9 and 10. Opposite side portions of plate 164 may be cut away, as indicated at 164c in FIG. 10, to permit electrical power connection to motor 22'. Locking tabs 164b are adapted to resiliently flex relative to main central portion 164a and are radially sized such that they are slightly deformed from the plane in which the main central portion lies, as shown in FIG. 9, as an incident to press fitting plate 164 within rigid sleeve 16'. The tendency for locking tabs 164b to return to their non-deformed condition causes their radially outer edges to "dig into" inner sleeve 16a' in order to prevent rotation of plate 164, and thus motor casing 80', relative to rigid sleeve 16' and to prevent movement of the plate from abutting engagement with surfaces 162.

However, in the case of actuator 10', the absence of track 72, balls 90 and tapered driving end portion 82b, renders it necessary to provide other means for positionally locating rotary component 24' axially within flexible sleeve 18'. Such means may include providing cage 92' with an enlarged, stepped bore opening 92a', which is sized to permit the cage to be journalled on casing extension 80c', and axially positionally locating the cage thereon by means of a bearing ring 170 and lock washer 172, which is disposed in frictional locking engagement with the casing extension and spaced from casing end 80a' sufficiently to allow for free rotational movement of the cage relative to casing 80'.

FIGS. 10 and 11 illustrate a further construction of a pressure member 186 particularly adapted for use with actuator 10'. Pressure member 186 is somewhat similar in construction and mode of operation to previously described pressure member 146 in that it can be of a one piece sheet metal construction and considered as having first, second and third portions 186a, 186b and 186c, respectively. First portion 186a is in the form of a generally rectangular, V-shaped plate 188 having a convex apex 188a arranged to face towards potentiometer strip surface 120a' and a pair of legs 190 and 190 joined to its opposite edges; second portion 186a is defined by the free ends or leg extensions 192 and 192 of legs 190 and 190; and third portion 186c is defined by a generally dome shaped projection or dimple carried by plate 188 to project from apex 188a for sliding engagement with surface 120a'. The width of free ends or leg extensions 192 and 192 need not be equal to the width of legs 190 and 190, as shown in FIG. 11. Groove 38' is made sufficiently wide to slidably receive both plate 188 and legs 190 and 190, and groove 40' is made sufficiently wide to receive free ends or leg extensions 192 and 192 in sliding engagement with its opposite sides 40b' and 40b'. Upon assembly of member 186 within grooves 38' and 40', the former is resiliently deformed to establish a bias for maintaining third portion 186c in sliding engagement with surface 120a' for purposes of generating a signal indicative of the relative positions of sleeves 12' and 14'.

The mode of operation of actuator 10' is similar to actuator 10 in that assembly 26' constrains motor casing 80' against rotation relative to inner sleeve 14' and cooperates with rotary component 24' to support motor 22' essentially concentrically within the inner sleeve. When motor 22' is energized, rotation of drive shaft 82' causes rollers 90' to roll along the inner surface 18b' of flexible sleeve portion 18', whereby the points of driving engagement of screw threads 70' with screw threads 30 advance in a direction extending annularly of the flexible sleeve portion and axial displacement of outer sleeve 12' is effected. The length of actuator 10' may also be adjusted in the event of power failure by manually rotating outer sleeve 12' relative to inner sleeve 14', due to the construction and mode of mounting potentiometer 28'.

The several forms of potentiometers 28 and 28' disclosed herein may be interchangeably employed with actuators 10 and 10' providing that recesses 38 and 38' of their associated inner sleeves 14 and 14' are properly sized to receive the pressure members 122, 126, 146 and 186 of such potentiometers.

Further, it is contemplated that inner sleeve 14 of actuator 10 may be of one piece, molded plastic construction, or alternatively that inner sleeve 14' of actuator 10' may be of a multiple part construction without departing from the present invention.

What is claimed is:

1. A rotary/linear actuator comprising in combination:
    an outer sleeve having an inwardly facing threaded portion;
    an inner sleeve having a resiliently deformable portion defining an outwardly facing threaded portion of a given axial length less than the axial length of said inwardly facing threaded portion and an annular inwardly facing concave track, said track being bounded by annular rim portions;
    rotary drive means including a plurality of balls and means to effect movement of said balls along an orbital path in engagement with said track to deform said resiliently deformable portion radially outwardly to position peripherally separate portions of said outwardly facing threaded portion in driving engagement with said inwardly facing threaded portion, whereby upon movement of said balls along said orbital path, said outer and inner sleeves undergo relative axial movement, said balls having a radius of curvature corresponding essentially to the radius of curvature of said track as measured transversely thereof, and said rim portions cooperate with said track to effect essentially uniform radial displacement of said outwardly facing threaded portion throughtout said axial length thereof.

2. A rotary/linear actuator according to claim 1, wherein said track and said rim portions are defined by an annular enlargement extending radially inwardly of an inner surface of said resiliently deformable portion, said rim portions having oppositely facing annular surfaces extending from adjacent opposite edges of said track in a radially outwardly divergent relationship towards said inner surface, and points of juncture of said oppositely facing surfaces and said inner surface are disposed in essential radial alignment with opposite axial ends of said outwardly facing threaded portion.

3. A rotary/linear actuator according to claim 2, wherein said drive means includes a drive shaft rotatable about an axis and having a tapered surface portion arranged to engage said balls, and said tapered surface portion forms an angle with said axis of rotation of said drive shaft which is less than an angle corresponding to one half of an arc angle through which the surfaces of said balls engage with said track.

4. A rotary/linear actuator according to claim 1, wherein said inner sleeve has a rigid generally cylindrical portion, said resiliently deformable portion has a mounting end disposed in an axially spaced relationship from said outwardly facing threaded portion, said mounting end includes an annular enlargement extending radially inwardly of an inner surface of said resiliently deformable portion, said enlargement having axially oppositely facing annular surfaces diverging radially inwardly from adjacent said inner surface of said resiliently deformable portion, and a connecting sleeve is provided for clampingly attaching said mounting end against one end of said rigid portion of said inner sleeve, said connecting sleeve and said one end of said rigid portion having outwardly and inwardly facing threaded portions, respectively, for adjustably connecting said connecting sleeve to said rigid portion, and said connecting sleeve and said rigid portion having facing annular clamping surfaces converging in a direction extending radially outwardly of said inner sleeve and arranged to removably clampingly engage said oppositely facing surfaces of said enlargement.

5. A rotary/linear actuator according to claim 4, wherein said mounting end defines an abutment arranged to project radially outwardly of said one end of said rigid portion, and said abutment limiting the extent of relative axial movement of said outer and inner sleeves in one direction for defining an extended position of said outer sleeve relative to said inner sleeve.

6. A rotary/linear actuator according to claim 5, wherein said resiliently deformable portion includes an opposite end disposed for abutment by said outer sleeve to define a contracted position thereof relative to said inner sleeve.

7. A rotary/linear actuator according to claim 6, wherein said track and said rim portions are defined by an annular enlargement extending radially inwardly of an inner surface of said resiliently deformable portion, said rim portions having oppositely facing annular surfaces extending from adjacent opposite edges of said track in a radially outwardly divergent relationship towards said inner surface, and the points of juncture of said oppositely facing surfaces and said inner surface are disposed in essential radial alignment with opposite axial ends of said outwardly facing threaded portion.

8. A rotary/linear actuator according to claim 7, wherein said drive means includes a drive shaft rotatable about an axis and having a tapered surface portion arranged to engage said balls, and said tapered surface portion forms an angle with said axis of rotation of said drive shaft which is less than an angle corresponding to one half of the arc angle through which the surfaces of said balls engage with said track.

9. A rotary/linear actuator according to claim 1, wherein potentiometer means is provided for indicating the relative axial position of said outer sleeve relative to said inner sleeve, said potentiometer means includes a potentiometer strip carried by and extending lengthwise of one of said outer and inner sleeves for generating a signal in response to pressure applied to a surface thereof and a pressure means carried by the other of said outer and inner sleeves and arranged to apply pressure to said surface, said one of said sleeves is provided with a lengthwise extending groove, said groove opening towards the other of said sleeves and mounting said potentiometer strip in a recessed condition therewithin with said surface facing towards said other of said sleeves, said other of said sleeves has an annular retaining groove opening towards said one of said sleeves, and said pressure means is an annular tension spring constrained by said retaining groove against movement axially of said other of said sleeves and arranged to bear in sliding surface engagement with said one of said sleeves and project into said groove for engagement with said surface.

10. A rotary/linear actuator according to claim 9, wherein said groove has a planar mounting surface, said strip potentiometer is fixed to said planar mounting surface, said surface includes a lengthwise extending rib arranged to upstand therefrom in a direction towards said other of said sleeves, and said tension spring projects into said groove for sliding engagement with said rib.

11. A rotary/linear actuator according to claim 1, wherein potentiometer means is provided for indicating the relative axial position of said outer sleeve relative to said inner sleeve, said potentiometer means including a potentiometer strip carried by and extending lengthwise of one of said sleeves for generating a signal in response to pressure applied to a surface thereof and a pressure means carried by the other of said sleeves and arranged to apply pressure to said surface, said one of said sleeves is provided with a lengthwise extending groove having facing side walls and a bottom wall joining said side walls, said groove opening towards said other of said sleeves, said potentiometer strip is fixed within said groove to said bottom wall and has lengthwise extending opposite edges spaced from said side walls, said other sleeve is provided with an annular retaining groove opening towards said one of said sleeves, and said pressure means bridges between said groove and said retaining groove and has a first portion slidably received within said retaining groove for guiding said pressure means for relative sliding movement annularly of said other of said sleeves, a second portion engaging with said side walls for guiding said pressure means for relative sliding movement lengthwise of said groove and a third portion resiliently biased into engagement with said surface of said potentiometer strip.

12. A rotary/linear actuator according to claim 11, wherein said pressure means is an integrally formed plastic member and said third portion is resiliently biased by a spring carried by said first portion.

13. A rotary/linear actuator according to claim 11, wherein said first portion includes a generally V-shaped plate having a convex apex arranged to face towards said surface of said potentiometer strip and opposite edge portions carrying first legs slidably received within said retaining groove, said second portion includes second legs joined to said opposite edge portions and arranged to engage with said side walls and said third portion is a projection carried by said plate to project from said apex into engagement with said surface of said potentiometer strip.

14. A rotary/linear actuator according to claim 11, wherein said first portion includes a generally V-shaped plate having a convex apex arranged to face towards said surface of said potentiometer strip and opposite edge portions carrying first legs, said plate and said first legs being slidably received within said retaining groove, said second portion including extensions of said first legs and arranged to engage with said side walls, and said third portion is a projection carried by said plate to project from said apex into engagement with said surface of said potentiometer strip.

15. A rotary/linear actuator according to claim 1, wherein said means to effect movement of said balls along said orbital path includes a motor having a casing formed with first and second ends and a drive shaft supported for rotation relative to said casing about an axis, said drive shaft extending outwardly through said first end of said casing and having a driving end tapered in a direction extending axially of said drive shaft in a direction away from said first end of said casing; a cage journalled on said motor for mounting said balls for radially directed movement within a plane annularly bisecting said track, said driving end engaging with said balls to effect movement thereof radially outwardly of said cage into engagement with said track; and motor mounting means carried by said inner sleeve for locating said second end of said casing essentially concentrically within said inner sleeve, said motor mounting means and said balls engaged with said track cooperating to support said motor within said inner sleeve.

16. A rotary/linear actuator according to claim 15, wherein said motor mounting means is adjustable for moving said motor axially of said inner sleeve to displace said driving end relative to said cage and said balls for controlling the extent of radial movement of said balls relative to said cage and said track.

17. A rotary/linear actuator according to claim 15, wherein said motor mounting means includes a generally C-shaped resiliently deformable snap ring having opposite ends, an annular inwardly facing groove defined by said inner sleeve for receiving said snap ring, a plate peripherally rotatably engaging with said inner sleeve intermediate said snap ring and said second end of said casing, an abutment carried by said plate and positioned intermediate said opposite ends of said snap ring for engagement therewith, a motor mount fixed to said second end of said casing, guide means for constraining said motor mount for sliding movement relative to said plate in a direction axially of said inner sleeve, and an adjustment screw connected to said plate and said motor mount for controlling the spacing therebetween.

18. A rotary/linear actuator according to claim 15, wherein said driving end has a tapered surface forming an angle with said axis of said drive shaft which is less than an angle corresponding to one half of an arc angle through which the surfaces of said balls engage with said track.

19. A rotary/linear actuator comprising in combination:
an outer sleeve having an inwardly facing threaded portion;
an inner sleeve having an outwardly facing threaded portion, said outwardly facing threaded portion being formed of resiliently deformable material and having an annular track of concave cross section opening radially inwardly of said inner sleeve;
a motor having a casing formed with first and second ends and a drive shaft supported for rotation relative to said casing, said drive shaft extending outwardly through said first end of said casing and having a driving end tapered in a direction extending axially of said drive shaft in a direction away from said first end of said casing;
a plurality of balls;
a cage journalled on said drive shaft for mounting said balls for radially directed movement within a plane annularly bisecting said track, said driving end engaging with said balls to effect movement thereof radially outwardly of said cage into engagement with said track to deform said inner sleeve and position peripherally separate portions of said outwardly facing threaded portion in driving engagement with said inwardly facing threaded portion, whereby upon rotation of said drive shaft said outer and inner sleeves undergo relative axial movement;
motor mounting means carried by said inner sleeve for locating said second end of said casing essentially concentrically within said inner sleeve and for adjustably moving said motor axially of said inner sleeve to displace said driving end relative to said cage and said balls for controlling the extent of radial movement of said balls relative to said cage and said track, said motor mounting means and said balls engaged with said track cooperating to support said motor within said inner sleeve.

20. A rotary/linear actuator according to claim 19, wherein said motor mounting means includes a generally C-shaped resiliently deformable snap ring having opposite ends, an annular inwardly facing groove defined by said inner sleeve for receiving said snap ring, a plate peripherally rotatably engaging with said inner sleeve intermediate said snap ring and said second end of said casing, an abutment carried by said plate and positioned intermediate said opposite ends of said snap ring for engagement therewith, a motor mount fixed to said second end of said casing, guide means for constraining said motor mount for sliding movement relative to said plate in a direction axially of said inner sleeve, and an adjustment screw connected to said plate and said motor mount for controlling the spacing therebetween.

21. In an actuator having inner and outer telescopically associated sleeves and potentiometer means for providing an indication of the relative axial position of one sleeve relative to the other, wherein the potentiometer means includes a potentiometer strip carried by and extending lengthwise of one of said sleeves for generating a signal in response to pressure applied to a surface thereof and a pressure means carried by the other of said sleeves and arranged to apply pressure to said surface of said potentiometer strip, the improvement comprising:
said one of said sleeves is provided with a lengthwise extending groove having facing side walls and a bottom wall joining said side walls, said groove opening towards said other of said sleeves, said potentiometer strip is fixed within said groove to said bottom wall, said other sleeve is provided with an annular retaining groove opening towards said one of said sleeves, and said pressure means bridges between said groove and said retaining groove and has a first portion slidably received within said retaining groove for guiding said pressure means for relative sliding movement annularly of said other of said sleeves, a second portion engaging with said side walls for guiding said pressure means for relative sliding movement lengthwise of said groove and a third portion resiliently biased into engagement with said surface of said potentiometer strip.

22. A rotary/linear actuator according to claim 21, wherein said second portion includes a pair of legs formed integrally with said first portion and spaced apart for sliding engagement one with each of said side walls, said third portion includes a projection and a compression spring, said projection being formed integrally with said first portion and having a pressure surface arranged for engagement with said surface of said potentiometer strip and an opposite surface, said first portion is formed with an opening extending therethrough and disposed in alignment with said opposite surface, and said spring is disposed within said opening with opposite ends thereof disposed in bearing engagement with said opposite surface and said other of said sleeves for biasing said pressure surface into engagement with said surface of said potentiometer strip.

23. A rotary/linear actuator according to claim 21, wherein said first portion includes a generally V-shaped plate having a convex apex arranged to face towards said surface of said potentiometer strip and opposite edge portions carrying first legs slidably received within said retaining groove, said second portion includes second legs joined to said opposite edge portions and arranged to engage with said side walls and said third portion is a projection carried by said plate to project from said apex into engagement with said surface of said potentiometer strip.

24. A rotary/linear actuator according to claim 21, wherein said first portion includes a generally V-shaped plate having a convex apex arranged to face towards said surface of said potentiometer strip and opposite edge portions carrying first legs, said plate and said first legs being slidably received within said retaining groove, said second portion including extensions of said first legs and arranged to engage with said side walls, and said third portion is a projection carried by said plate to project from said apex into engagement with said surface of said potentiometer strip.

25. A rotary/linear actuator comprising in combination:
an outer sleeve having an inwardly facing threaded portion;
an inner sleeve having integrally formed rigid and resiliently deformable portions defining axially opposite end portions thereof, said deformable portion defining an inner surface, an outwardly facing threaded portion and abutments disposed adjacent axially opposite ends of said outwardly facing threaded portion, said inner sleeve supporting said outer sleeve for movement axially thereof, said abutments engaging with said outer sleeve to limit axial movement of said outer sleeve relative to said inner sleeve to define extended and contracted positions of said actuator;

a motor having a casing formed with first and second ends and a drive shaft supported for rotation relative to said casing, said drive shaft extending outwardly through said first end of said casing; a plurality of rotary members;

a cage journalled on said motor for mounting said rotary members for engagement with peripherally separate portions of said inner surface and for rotation relative to each other and said cage, said drive shaft engaging with said rotary members to maintain said rotary members in engagement with said inner surface to effect deformation of said deformable portion and position peripherally separate portions of said outwardly facing threaded portion in driving engagement with said inwardly facing threaded portion, whereby upon rotation of said drive shaft said outer and inner sleeves undergo relative axial movement;

motor mounting means carried by said rigid portion of said inner sleeve and connected to said second end of said casing for positionally locating said motor axially within said inner sleeve, said motor mounting means and said rotary members engaged with said inner surface cooperating to support said motor essentially concentrically within said inner sleeve; and means carried by said motor for constraining said cage against movement axially of said motor.

26. A rotary/linear actuator according to claim 25, wherein said rigid portion of said inner sleeve is formed with a groove extending lengthwise thereof and opening towards said outer sleeve, said outer sleeve is formed with an annular retaining groove opening towards said inner sleeve, and touch controlled potentiometer means is provided to indicate the relative axial position of said outer sleeve relative to said inner sleeve, said potentiometer means includes a potentiometer strip fixed within said groove and extending lengthwise thereof for generating a signal in response to pressure applied to a surface thereof facing towards said outer sleeve and pressure means for applying pressure to said surface of said potentiometer strip, said pressure means bridges between said groove and said retaining groove and includes a first portion slidably received within said retaining groove for guiding said pressure means for relative sliding movement annularly of said outer sleeve, a second portion engaging with said groove for guiding said pressure means for relative sliding movement lengthwise of said inner sleeve and a third portion resiliently biased into engagement with said surface of said potentiometer strip.

* * * * *